US012802000B2

(12) United States Patent
Fienberg et al.

(10) Patent No.: US 12,802,000 B2
(45) Date of Patent: Nov. 17, 2026

(54) DETERMINING A PRIORITY SCORE OF A COMPUTER SYSTEM ALERT BY USING A MACHINE LEARNING OPERATION

(71) Applicant: CYLANCE INC., Plano, TX (US)

(72) Inventors: Aaron Mark Tresch Fienberg, Irvine, CA (US); Julian Collado Umana, Irvine, CA (US)

(73) Assignee: CYLANCE INC., Plano, TX (US)

( * ) Notice: Subject to any disclaimer, the term of this patent is extended or adjusted under 35 U.S.C. 154(b) by 563 days.

(21) Appl. No.: 18/465,406

(22) Filed: Sep. 12, 2023

(65) Prior Publication Data

US 2025/0086520 A1 Mar. 13, 2025

(51) Int. Cl.
*G06N 20/10* (2019.01)

(52) U.S. Cl.
CPC .................................... *G06N 20/10* (2019.01)

(58) Field of Classification Search
CPC ...................................................... G06N 20/10
See application file for complete search history.

(56) References Cited

U.S. PATENT DOCUMENTS 11,726,889 B1 8/2023 Rao et al.
2017/0300814 A1* 10/2017 Shaked .................. G06N 3/084
2018/0018459 A1 1/2018 Zhang et al.
2018/0157845 A1 6/2018 Mehta
2018/0309793 A1 10/2018 Ardanza Azcondo et al.
2019/0363925 A1 11/2019 Davis et al.
2020/0274894 A1 8/2020 Argoeti et al.
2021/0120014 A1* 4/2021 Argoety .............. H04L 41/0609
2021/0312058 A1 10/2021 Chiarelli et al.
2021/0357436 A1 11/2021 Filios et al.
2022/0179957 A1 6/2022 Kuskov et al.
2023/0007023 A1 1/2023 Andrabi et al.
2023/0127836 A1 4/2023 Batson et al.

OTHER PUBLICATIONS

International Search Report and Written Opinion in International Appln. No. PCT/US2024/046001, mailed on Oct. 24, 2024, 15 pages.
Non-Final Office Action in U.S. Appl. No. 18/465,391, mailed on Jul. 29, 2025, 34 pages.
International Search Report and Written Opinion in International Appln. No. PCT/US2024/046041, mailed on Nov. 20, 2024, 13 pages.

* cited by examiner

*Primary Examiner* — Christopher E Dunay
(74) *Attorney, Agent, or Firm* — Fish & Richardson P.C.

(57) ABSTRACT

Systems, methods, and software can be used to determine whether a priority score of an alert. In some aspects, a method includes: receiving an alert, wherein the alert comprises activity information and user information; obtaining a set of activity features based on the activity information; obtaining a set of user features based on the user information; and determining a score of the alert based on the set of activity features and the set of user features.

13 Claims, 4 Drawing Sheets

DETERMINING A PRIORITY SCORE OF A COMPUTER SYSTEM ALERT BY USING A MACHINE LEARNING OPERATION

TECHNICAL FIELD

The present disclosure relates to determining a priority score of an alert by using a machine learning operation.

BACKGROUND

In some implementations, a computer security system uses alerts to identify activities in a monitored computer system or network that may pose security risks. Different alerts may be generated when different activities are performed, e.g., accessing a particular resource, receiving or transmitting content that includes particular components, executing software code that includes specific routines or instructions. The computer security system can analyze these alerts to determine whether the monitored computer system or network may be under attack.

DESCRIPTION OF DRAWINGS

Like reference numbers and designations in the various drawings indicate like elements.

DETAILED DESCRIPTION

In some implementations, even for activities that may have a small chance of creating security issues, an alert may still be configured for these activities, for caution. As a result, a large number of alerts may be generated during routine operation of a computer system or network. Due to the high number of alerts, responses may be delayed in order to determine which alerts need to be handled quickly.

In some operations, the alerts may be prioritized automatically. A priority score of the alert can be determined automatically and the alert with higher priority score can be handled first. This approach reduces the response time of the alert that generates higher security risk and makes the computer network more secure. In some cases, whether an alert may impose a higher security risk may depend on not only the nature of the activity that triggers the alert, but also the type of user that initiates the activity. Therefore, a machine learning operation that processes the information of the activity that triggers the alert and information of the user that initiates the activity jointly, can be used to determine the priority score of the alert. This approach can improve the accuracy of priority determination of the alert. FIGS. 1-4 and associated descriptions provide additional details of these implementations.

Figure 1:
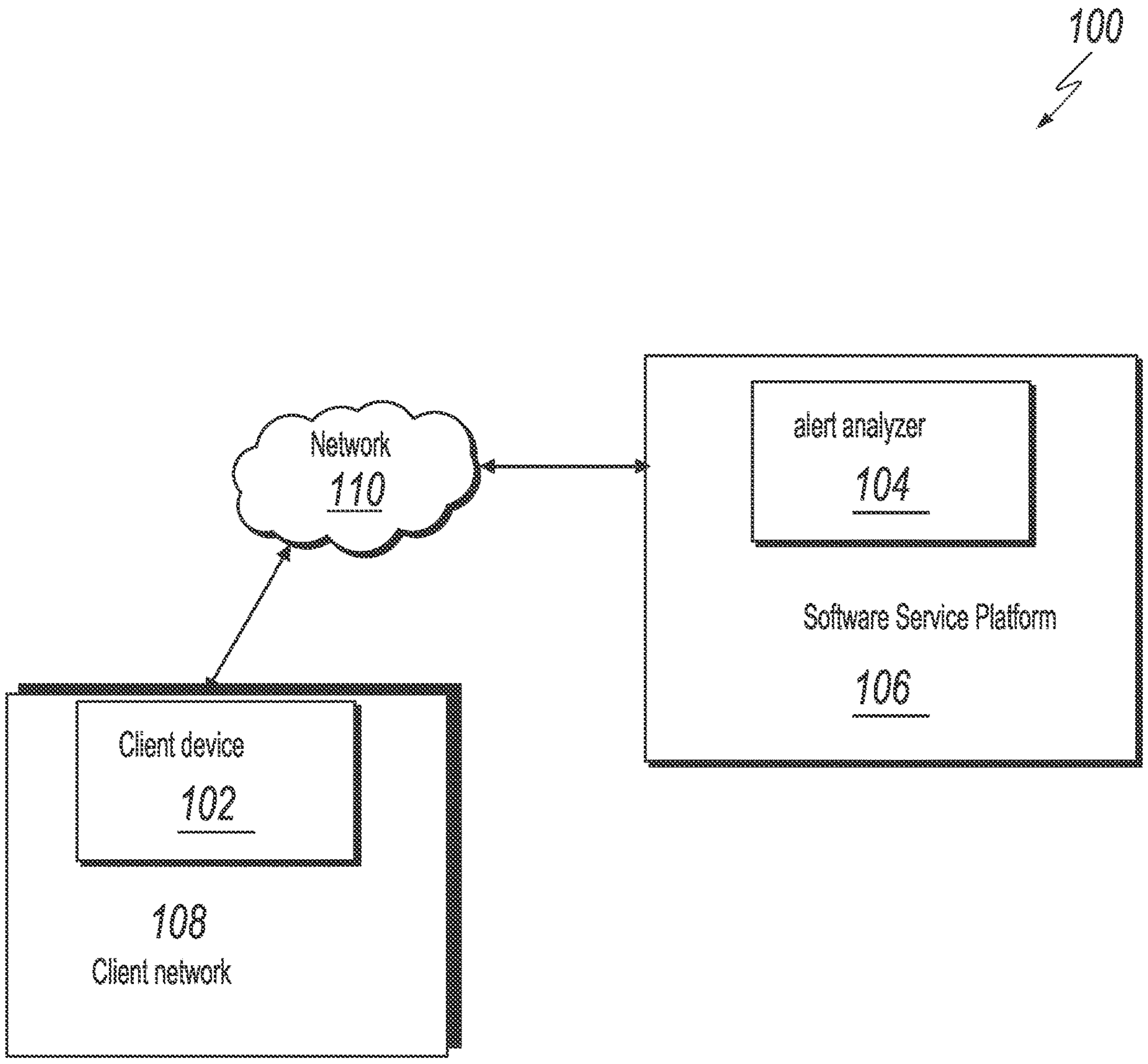
FIG. 1 is a schematic diagram showing an example system that determines a priority score of an alert, according to an implementation.

FIG. 1 is a schematic diagram showing an example system 100 that determines a priority score of an alert, according to an implementation. At a high level, the example system 100 includes a software service platform 106 that is communicatively coupled with a client network 108 over a network 110.

Figure 2:
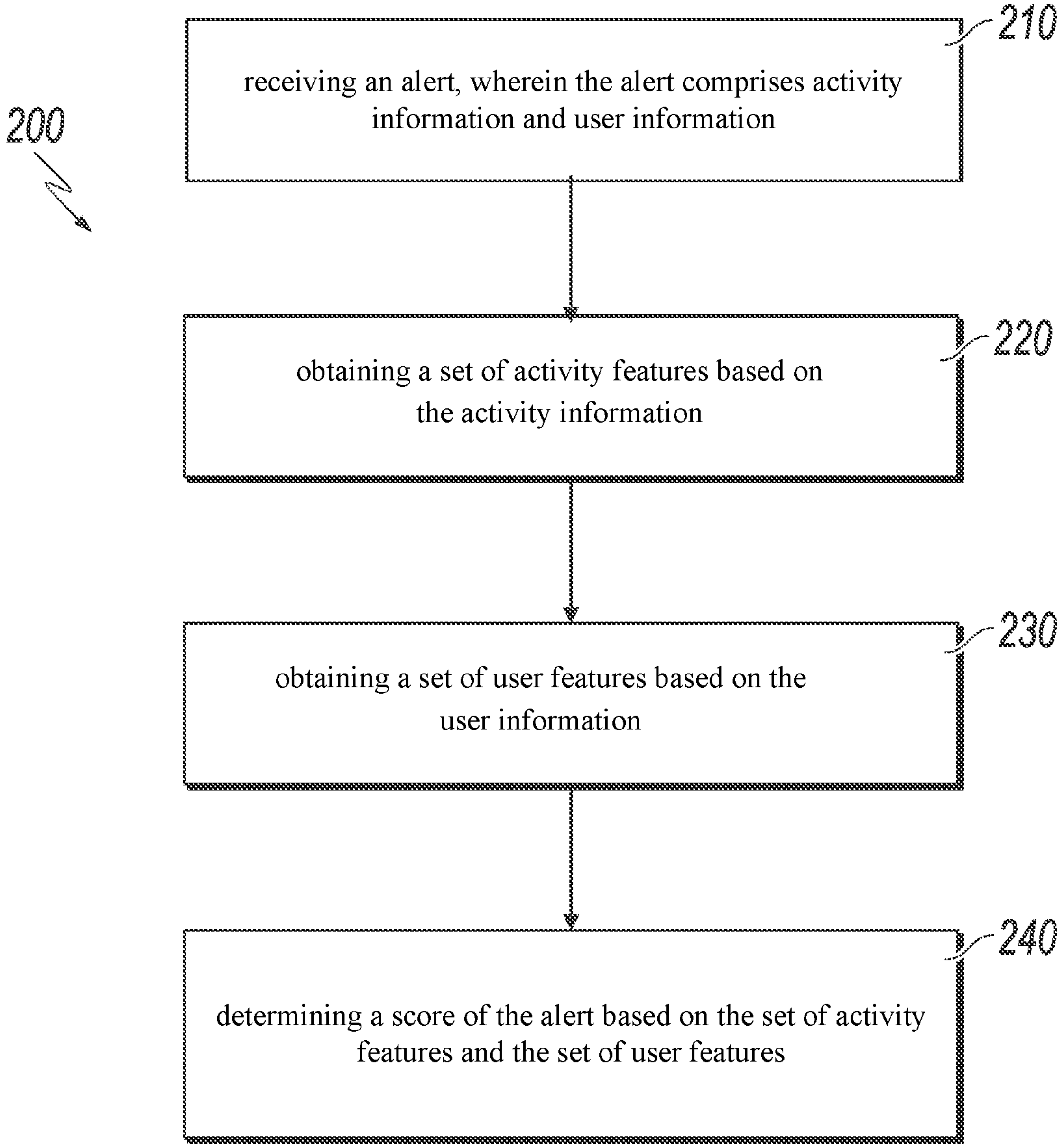
FIG. 2 is a flowchart showing an example method for an operation of determining a priority score of an alert, according to an implementation.
Figure 3:
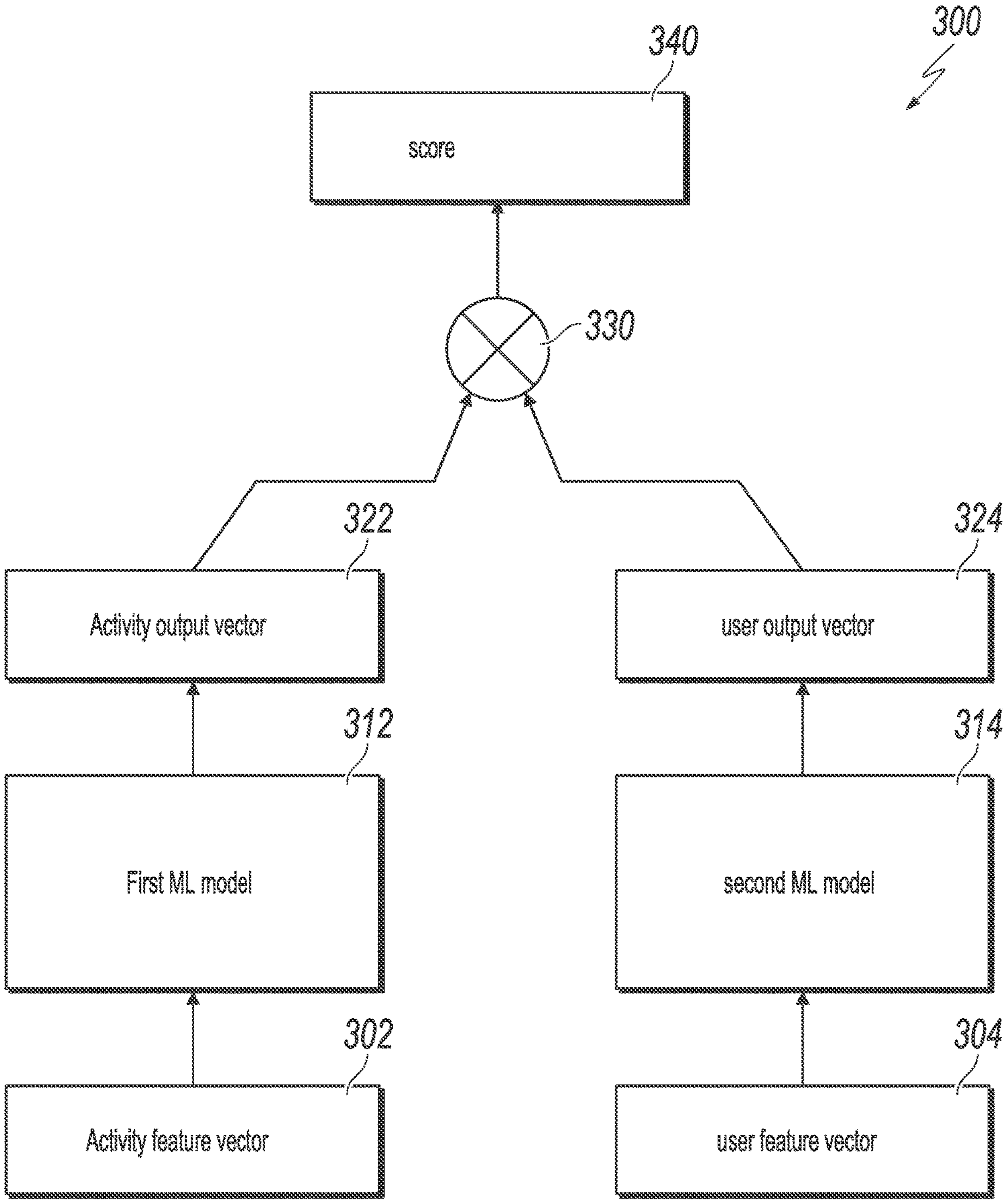
FIG. 3 is a schematic diagram illustrating an example operation that determines the priority score, according to an implementation.
Figure 4:
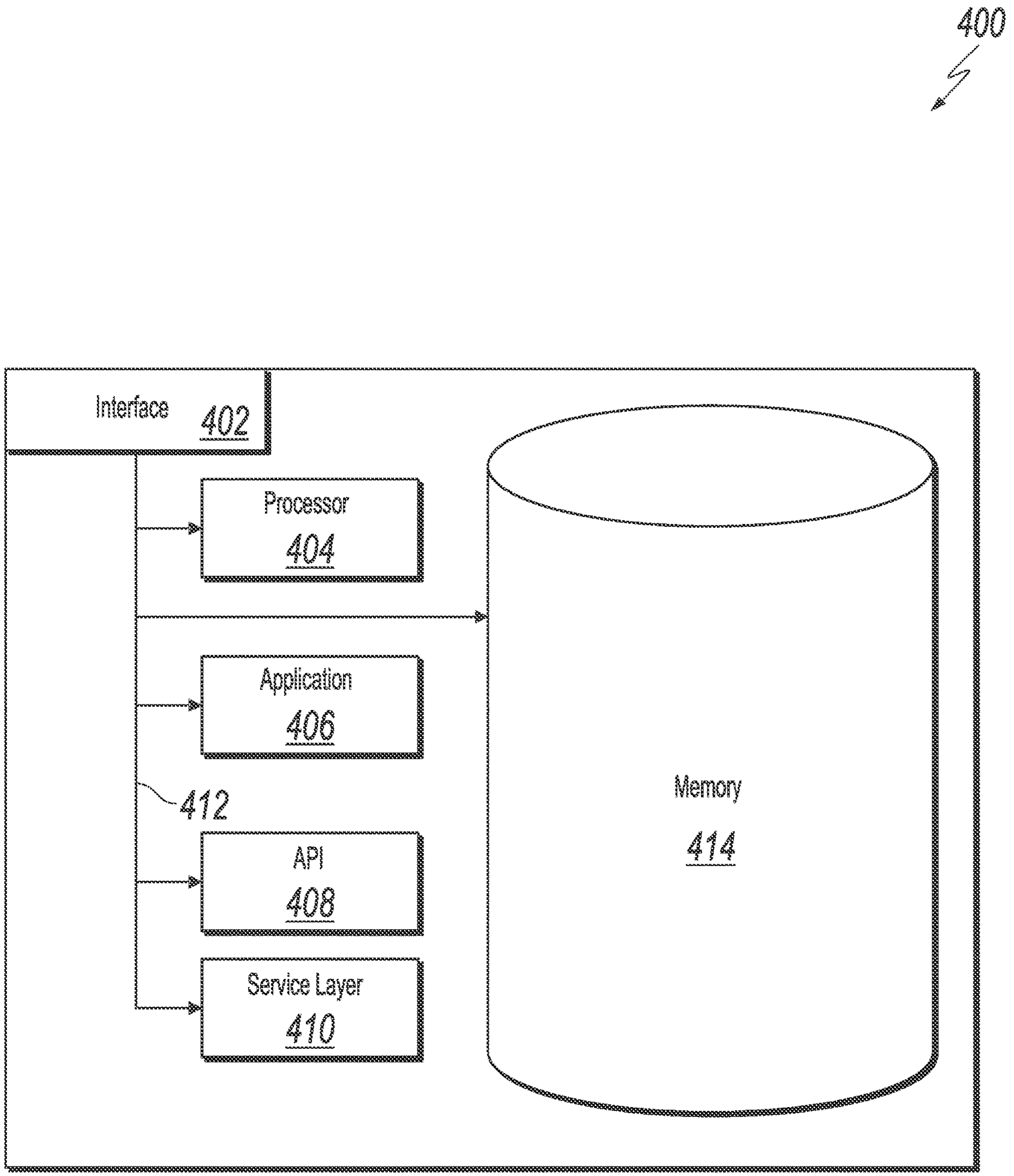
FIG. 4 illustrates a high-level architecture block diagram of a computer according to an implementation.

The client network 108 represents a computer network that is being monitored for security. The client network 108 includes one or more client devices 102. The client device 102 represents an electronic device that performs computerization activities and communications with other devices in or outside of the client network 108. In some cases, the client device 102 can detect activities that may trigger the alert. The client device 102 can send the alert to the software service platform 106. FIGS. 2-4 and associated descriptions provide additional details of these implementations.

The software service platform 106 represents an application, a set of applications, software, software modules, hardware, or any combination thereof, that determines a priority score of the alert. The software service platform 106 can be an application server, a service provider, or any other network entity. The software service platform 106 can be implemented using one or more computers, computer servers, or a cloud-computing platform. Though illustrated to be outside of the client network 108 in FIG. 1, in some implementations, part or all of the software service platform can be implemented within the client network 108. The software service platform 106 can be used to train machine learning models that are used in the priority score determination operation. The software service platform 106 includes an alert analyzer 104. The alert analyzer 104 represents an application, a set of applications, software, software modules, hardware, or any combination thereof, that analyzes the alert and determines the priority score of the alert. In some implementations, the alert analyzer 104 can receive the alert, obtain activity features of the alert, and obtain user features of the user that initiates the activity triggering the alert. The activity features and the user features can be used to determine a priority score of the alert. In some cases, machine learning operations including multiple machine learning models are used to determine the alert score. FIGS. 2-4 and associated descriptions provide additional details of these implementations.

Turning to a general description, the client device 102 may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example system 100 includes the network 110. The network 110 represents an application, set of applications, software, software modules, hardware, or combination thereof, that can be configured to transmit data messages between the entities in the example system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flowchart showing an example method 200 for an operation of determining priority score of an alert, according to an implementation. The example method 200 can be implemented by a server, e.g., the software service platform 106 shown in FIG. 1, one or more electronic devices in the network that generate the alert, e.g., the client device 102 shown in FIG. 1, or a combination thereof. The example method 200 shown in FIG. 2 can be implemented using additional, fewer, or different operations, which can be performed in the order shown or in a different order.

At 210, the alert is received. In some cases, the alert can be received by the server that determines the priority score. The alert is generated by the client network when a relevant activity triggers the alert according to a security policy. The security policy can be configured by a manufacturer, an owner or a user of the client network. The security policy can also be configured by an administrator of an organization that is associated with the user of the client network, e.g., an Information Technology (IT) administrator of the client network. The security policy can include a rule or heuristic of activities that may trigger the alert. Examples of the configured relevant activities that may trigger the alert include resource access to one or more particular resources, invocation of particular Application Programming Interface (API) calls, particular activities with high security sensitivity, activities conducted at particular time or over a particular duration, activities initiated by user or endpoint devices with particular identity (ID), operations that contain particular process IDs or particular command line arguments, or any combination thereof. In addition, executable files or scripts that are associated with particular activities may also trigger the alert. Other activities may also be configured to trigger the alert.

In some cases, the alert can be represented in a data object. For example, the alert can be represented in the format of a JavaScript Object Notation (JSON).

The alert includes activity information. The activity information can indicate the specific activity that triggers the alert. In some implementations, different activities can be assigned to different activity IDs. The activity information can include the ID of the activities that trigger the alert. The activity information can also include the time when the alert is triggered, the parameters of the API calls that trigger the alert, the name of the resource that triggers the alert, the length of the activity that triggers the alert, or other information of the activity that triggers the alert.

The alert also includes user information. The user information includes user profile information of the user that initiates the activity that triggers the alert. Examples of the user profile information include the name or identity (ID) of the user, the employer and job title of the user, geographic location of the user (e.g., country and state). In some cases, the user profile information can be obtained through a user profile file. For example, the IT administrator of the employer of the user can generate a user profile file that contains user profile information of the user and stores the user profile on the electronic device. Alternatively, or additionally, the user can provide the user profile information into the electronic device through a user interface.

In some cases, the user information can also include information of usage behavior and pattern, e.g., browsing history, access history (including e.g., read/write/keystroke/audio/video/screen access), application installation history, application usage history, etc. In some cases, information of usage behavior and pattern can be obtained by processing user data that captures the user activity pattern on the client device on which the alert is triggered. In some cases, the client device can be used by only one user and, thus, the information of usage behavior and pattern of the user is the same as the information of usage behavior and pattern of the client device. In other cases, the client device can be used by multiple users and, thus, the information of usage behavior and pattern of the user may be different for each user. In these cases, the information of usage behavior and pattern of the user and the user profile information are information for the particular user initiating an activity that triggers alert.

In some cases, the user information can also include information of the client device, e.g., the hardware configuration information including memory, processor, graphics, input and output interface, the software configuration information including operating system, other software already installed on the client device, etc. In some cases, information of the client device can be obtained through a configuration file of the client device, e.g., system configuration file.

As discussed previously, the alert is generated by the client network. In some cases, one or more client devices in the client network include a monitoring software that monitors the operation of the client device, and generate the alert if a relevant activity that is configured by the security policy is initiated on the client device, received by the client device, or both. Alternatively or additionally, one or more electronic devices in the client network can monitor the data exchanged between different devices in the client network and can generate the alert if the relevant activity is detected. Once the alert is generated, the alert is sent to the software service platform. In some cases, the alert can be sent by the client device that generates the alert. Alternatively or additionally, the alert can be sent to one or more devices in the client network that collect the alert and send the alert to the software service platform.

At 220, a set of activity features is obtained based on the activity information. The activity features include the name or ID of the activity, the time of the activity, the duration of the activity, parameters or arguments associated with the activity and the other features. In some operations, each activity feature can be converted to a numerical value, in format of integer numbers or floating point numbers. The numerical values can be concatenated into one or more activity feature vectors. Alternatively or additionally, the numerical values can be combined or transformed to generate the one or more activity feature vectors. Example of the transformation or combination techniques include multiplication, addition, passing through a non-linear transformation function (e.g., Fourier, Rectifying, or etc.).

At 230, a set of user features is obtained based on the user information. In some operations, each user feature can be converted to a numerical value, in the format of integer numbers or floating point numbers. The numerical values can be concatenated into one or more user feature vectors. Alternatively or additionally, the numerical values can be combined or transformed to generate the one or more user feature vectors. Example of the transformation or combination techniques include multiplication, addition, passing through a non-linear transformation function (e.g., Fourier, Rectifying, or etc.).

In some cases, the set of user features can also include user group features. In some cases, e.g., the user may be a new user and there may not be sufficient information of the individual user. In these cases, the user group features can be used in addition to individual user features discussed previously. A user group can be determined based on the ID of the user in the user information. The user group can be the group of users that have the same job function as the user, the same rank as the user, the same geographic location as the user, or other group of users that share one or more common characteristics of the user. The user group features of the determined user group can be obtained. Examples of the user group features include common usage behavior and pattern of the user group. For example, the user group features can include the average number of accesses to a particular resource for the user group, the installed software that is common to the user group. In some cases, the software service platform can store the user group features for different user groups in a database, and can search the database to find the user group features of the user group to which user belongs. In some case, a user may belong to different user groups, e.g., the user group that shares the same job function as the user, and the user group that shares the same geographic location of the user. The software service platform can include user group features of these user groups in the set of user features. Similar to the individual user feature discussed previously, the user group features can also be converted to feature vectors and be processed together with the individual user feature vectors. Alternatively or additionally, the user group features can be combined with the individual user features and converted to user feature vectors together.

At 240, a score of the alert is determined based on the set of activity features and the set of the user features. The score indicates the priority of the alert.

In some cases, the calculation of the score can be performed by the software service platform. In these cases, the software service platform receives the alert and performs the conversion process to generate the activity feature vector and the user feature vector.

In some implementations, the score can be calculated by using a machine learning (ML) operation. FIG. 3 is a schematic diagram 300 illustrating an example operation that determines the score, according to an implementation. The illustrated operation can be implemented as computer programs on one or more computers in one or more locations, in which the systems, components, and techniques described below can be implemented.

The schematic diagram 300 includes a first ML model 312 and a second ML model 314. The first ML model 312 and the second ML model 314 can be implemented by using any appropriate machine learning model architecture that enables it to perform its described function. For example, when configured as a neural network, the first ML model 204 may include at least one neural network layer, e.g., at least one fully connected layer or convolutional layer or transformers. Alternatively or additionally, the first ML model 204 may be a graph neural network, a recurrent neural network, other machine learning models, or any combinations thereof. In the case of multiple neural network layers, they may be stacked, so as to pass data successively between them in a certain layer order. Each neuron in one layer is connected to some or all neurons in the next layer.

In some cases, the ML models, e.g., the first ML model 312 and the second ML model 314 can include the following layers: an input layer that takes input vectors and passes them to the rest of the network; one or more hidden layers that are intermediate layers between the input and output layer and process the data by applying complex non-linear functions to them, and an output layer that takes as input the processed data and produces the final results.

The hidden layers transform the input features into processed features. Each layer is implemented by using mathematical functions that apply weights to the input to produce an output specific to an intended result. In some cases, hidden layers can be implemented in a hierarchical way, where each layer in the hidden layers is specialized in producing one transformation for a target result and passes the output values to the next layer for further processing.

The first ML model 312 and the second ML model 314 can have the same or different types. For example, both the first ML model 312 and the second ML model 314 can be a transformer neural network, but they may have different number of layers or neurons. In another example, the first ML model 312 and the second ML model 314 can be machine learning models of different types, e.g., a transformer neural network and a convolutional neural network. In some cases, the first ML model 312 and the second ML model 314 are trained jointly on a training dataset. Alternatively, the first ML model 312 and the second ML model 314 can be trained separately on the same or different datasets.

In some cases, during the initial training when the training data set is small, one or more features, e.g., the user feature of the employment level of the user, may be assigned a higher weight than other features. This approach may make it more likely that an alert related to a user in a higher position to receive a higher score and, thus, making the alert more prioritized. Other example features with elevated weight may include activity feature of accessing a particular sensitive resource in the client network.

In the illustrated example, the first ML model 312 takes activity feature vector 302 as input and generates activity output vector 322. The second ML model 314 takes user feature vector 304 as input and generates user output vector 324. The activity feature vector 302 and the user feature vector 304 can have the same or different lengths. The activity output vector 322 and the user output vector 324 have the same length.

A dot product operation 330 can be performed on the activity output vector 322 and the user output vector 324 to produce the score 340. Additionally or alternatively, other combination or transformation functions (e.g., concatenation) can be used to combine the activity output vector 322 and the user output vector 324 to produce a combined value that is used to determine the score 340, e.g., by comparing the combined value to a threshold. In some cases, as discussed below, a third ML model can be used to determine the score 340 based on the activity output vector 322 and the user output vector 324. In one example, cosine similarity between the activity output vector 322 and the user output vector 324 can be calculated and used as a metric of similarity.

In some implementations, instead of using two ML models as illustrated in FIG. 3, one ML model can be trained to generate the score. In one example, the activity feature vector and the user feature vector can be concatenated to form one joint input vector. The one ML model can process the joint input vector and generate the score.

In some implementations, instead of using the dot product operation 330 to obtain the score as illustrated in FIG. 3, a third ML model can be used to determine the score. Like the first ML model 312 and the second ML model 314 discussed previously, the third ML model can be implemented by using any appropriate machine learning model architecture, e.g., a neural network such as a multilayer perceptron (MLP), a graph neural network, or a recurrent neural network. The third ML model can take the activity output vector 322 and the user output vector 324 as the inputs, and provides the score as output. The third ML model can be trained jointly or separately with the first ML model 312 and the second ML model 314.

In addition, or as alternative, to the activity output vector 322 and the user output vector 324, the third ML model can use other inputs that are provided by the first ML model 312 and the second ML model 314. Examples of these other inputs can include residual connections of the first ML model 312 or the second ML model 314. Examples of the residual connections can include representations of part or all of the inputs of the first ML model 312 or the second ML model 314, representations of internal processing results of one or more internal layers of the first ML model 312 or the second ML model 314, or any combinations thereof.

In some cases, the software service platform can compare the score with a threshold score to determine whether the alert should be discarded. For example, if the score is lower than the threshold score, the alert is determined to be spurious and can be discarded. Alternatively, if the score is higher than the threshold score, the alert is determined to be important and can be further processed. In some cases, an alert handling policy can be used to configure whether the alert is spurious based on different comparison results, i.e., the score is larger than the threshold score, the score is smaller than the threshold score, or the score is the same as the threshold score.

In some cases, a notification may be generated. For example, the notification can be generated in response to the alert being determined to be important. The notification can include indication of whether the alert is determined to be important. The notification can also include the score, the threshold score, information of the activity feature, information of the user feature, or any combination thereof. The notification can be output in a user interface of the software service platform. In some case, a visual or audio alert may be outputted at the software service platform to indicate that an important alert is received. Alternatively, or additionally, the notification can be sent to another device, e.g., a manager server of the employer of the user, a mobile device of an administrator of the client network, or etc.

In some cases, multiple threshold scores can be configured to provide different handling mechanisms for the alert. For example, a notification can be sent to devices associated with different level of supporting staff based on which threshold score that the score exceeds. A higher score may trigger the notification to be sent to devices of response team with faster turn around time. In another example, if the score exceeds a particular threshold score, one or more automatic responses may be implemented for the user that triggers the alert. Examples of the automatic response can include locking out the user, denying the user from one or more configured access or read/write privileges, and etc.

FIG. 4 illustrates a high-level architecture block diagram of a computer 400 according to an implementation. The computer 400 can be implemented as the software service platform 106 and the client device 102 of FIG. 1. The computer 400 can also be used to implement the operations discussed in FIGS. 2-3. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

In some cases, the processing algorithm of the code package establishment can be implemented in an executable computing code, e.g., C/C++ executable codes. In some cases, the computer 400 can include a standalone Linux system that runs batch applications. In some cases, the computer 400 can include mobile or personal computers.

The computer 400 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 400 can serve as a client, network component, a server, a database or other persistency, and/or any other components. In some implementations, one or more components of the computer 400 may be configured to operate within a cloud-computing-based environment.

At a high level, the computer 400 is an electronic computing device operable to receive, transmit, process, store, or manage data. According to some implementations, the computer 400 can also include or be communicably coupled with an application server, e-mail server, web server, caching server, streaming data server, business intelligence (BI) server, and/or other server.

The computer 400 can collect data of network events or mobile application usage events over network 110 from a web browser or a client application, e.g., an installed plugin. In addition, data can be collected by the computer 400 from internal users (e.g., from a command console or by another appropriate access method), external or third parties, other automated applications, as well as any other appropriate entities, individuals, systems, or computers.

Each of the components of the computer 400 can communicate using a system bus 412. In some implementations, any and/or all the components of the computer 400, both hardware and/or software, may interface with each other and/or the interface 402 over the system bus 412 using an Application Programming Interface (API) 408 and/or a service layer 410. The API 408 may include specifications for routines, data structures, and object classes. The API 408 may be either computer language-independent or -dependent and refer to a complete interface, a single function, or even a set of APIs. The service layer 410 provides software services to the computer 400. The functionality of the computer 400 may be accessible for all service consumers using this service layer. Software services, such as those provided by the service layer 410, provide reusable, defined business functionalities through a defined interface. For example, the interface may be software written in JAVA, C++, or other suitable languages providing data in Extensible Markup Language (XML) format or another suitable format. While illustrated as an integrated component of the computer 400, alternative implementations may illustrate the API 408 and/or the service layer 410 as stand-alone components in relation to other components of the computer 400. Moreover, any or all parts of the API 408 and/or the service layer 410 may be implemented as child or sub-modules of another software module, enterprise application, or hardware module without departing from the scope of this disclosure.

The computer 400 includes an interface 402. Although illustrated as a single interface 402 in FIG. 4, two or more interfaces 402 may be used according to particular needs, desires, or particular implementations of the computer 400. The interface 402 is used by the computer 400 for communicating with other systems in a distributed environment connected to a network (whether illustrated or not). Generally, the interface 402 comprises logic encoded in software and/or hardware in a suitable combination and operable to communicate with the network. More specifically, the interface 402 may comprise software supporting one or more communication protocols associated with communications such that the network or interface's hardware is operable to communicate physical signals within and outside of the computer 400.

The computer 400 includes at least one processor 404. Although illustrated as a single processor 404 in FIG. 4, two or more processors may be used according to particular needs, desires, or particular implementations of the computer. Generally, the processor 404 executes instructions and manipulates data to perform the operations of the computer 400. Specifically, the processor 404 executes the functionality disclosed in FIGS. 1-4.

The computer 400 also includes a memory 414 that holds data for the computer 400. Although illustrated as a single memory 414 in FIG. 4, two or more memories may be used according to particular needs, desires, or particular implementations of the computer 400. While memory 414 is illustrated as an integral component of the computer 400, in alternative implementations, memory 414 can be external to the computer 400.

The application 406 is an algorithmic software engine providing functionality according to particular needs, desires, or particular implementations of the computer 400, particularly with respect to functionality required for anomaly detection. Although illustrated as a single application 406, the application 406 may be implemented as multiple applications 406 on the computer 400. In addition, although illustrated as integral to the computer 400, in alternative implementations, the application 406 can be external to the computer 400.

There may be any number of computers 400 associated with, or external to, and communicating over a network. Furthermore, this disclosure contemplates that many users may use one computer 400, or that one user may use multiple computers 400.

Described implementations of the subject matter can include one or more features, alone or in combination.

For example, in a first implementation, a method, comprising: receiving an alert, wherein the alert comprises activity information and user information; obtaining a set of activity features based on the activity information; obtaining a set of user features based on the user information; and determining a score of the alert based on the set of activity features and the set of user features.

The foregoing and other described implementations can each, optionally, include one or more of the following features:

A first feature, combinable with any of the following features, wherein the determining the score comprises: determining an activity feature vector based on the set of activity features; determining a user feature vector based on the set of user features; and determining the score based on the activity feature vector and the user feature vector.

A second feature, combinable with any of the previous or following features, wherein the obtaining a set of user features comprises: determining, a user group based on the user information; and wherein the set of user features comprises a feature of the user group.

A third feature, combinable with any of the previous or following features, wherein the score is determined using a machine learning operation.

A fourth feature, combinable with any of the previous or following features, wherein machine learning operations comprises processing an activity feature vector by using a first machine learning model and processing a user feature vector by using a second machine learning model.

A fifth feature, combinable with any of the previous or following features, wherein the score is determined by combining a first output of the first machine learning model and a second output of the second machine learning model.

A sixth feature, combinable with any of the previous features, further comprising: performing a responsive action based on the score.

In a second implementation, a computer-readable medium containing instructions which, when executed, cause an electronic device to perform operations comprising: receiving an alert, wherein the alert comprises activity information and user information; obtaining a set of activity features based on the activity information; obtaining a set of user features based on the user information; and determining a score of the alert based on the set of activity features and the set of user features.

The foregoing and other described implementations can each, optionally, include one or more of the following features:

A first feature, combinable with any of the following features, wherein the determining the score comprises: determining an activity feature vector based on the set of activity features; determining a user feature vector based on the set of user features; and determining the score based on the activity feature vector and the user feature vector.

A second feature, combinable with any of the previous or following features, wherein the obtaining a set of user features comprises: determining, a user group based on the user information; and wherein the set of user features comprises a feature of the user group.

A third feature, combinable with any of the previous or following features, wherein the score is determined using a machine learning operation.

A fourth feature, combinable with any of the previous or following features, wherein machine learning operations comprises processing an activity feature vector by using a first machine learning model and processing a user feature vector by using a second machine learning model.

A fifth feature, combinable with any of the previous or following features, wherein the score is determined by combining a first output of the first machine learning model and a second output of the second machine learning model.

A sixth feature, combinable with any of the previous features, the operations further comprising: performing a responsive action based on the score.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising receiving an alert, wherein the alert comprises activity information and user information; obtaining a set of activity features based on the activity information; obtaining a set of user features based on the user information; and determining a score of the alert based on the set of activity features and the set of user features.

The foregoing and other described implementations can each, optionally, include one or more of the following features:

A first feature, combinable with any of the following features, wherein the determining the score comprises: determining an activity feature vector based on the set of activity features; determining a user feature vector based on the set of user features; and determining the score based on the activity feature vector and the user feature vector.

A second feature, combinable with any of the previous or following features, wherein the obtaining a set of user features comprises: determining, a user group based on the user information; and wherein the set of user features comprises a feature of the user group.

A third feature, combinable with any of the previous or following features, wherein the score is determined using a machine learning operation.

A fourth feature, combinable with any of the previous or following features, wherein machine learning operations comprises processing an activity feature vector by using a first machine learning model and processing a user feature vector by using a second machine learning model.

A fifth feature, combinable with any of the previous or following features, wherein the score is determined by combining a first output of the first machine learning model and a second output of the second machine learning model.

A sixth feature, combinable with any of the previous features, the operations further comprising: performing a responsive action based on the score.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms “data processing apparatus,” “computer,” or “electronic computer device” (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a Global Positioning System (GPS) receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security, or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless LAN (WLAN) using, for example, 802.11 a/b/g/n/ac/ax/be and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A method, comprising:

receiving an alert, wherein the alert comprises activity information and user information;

obtaining a set of activity features based on the activity information, wherein the activity information indicates an activity that triggers the alert, and the set of activity features comprises features of the activity that triggers the alert;

obtaining a set of user features based on the user information, wherein the set of user features comprises features of a user that initiates the activity; and determining a score of the alert based on the set of activity features and the set of user features, wherein the determining the score comprises:

using a first machine learning model to process an activity feature vector determined based on the set of activity features;

using a second machine learning model to process a user feature vector determined based on the set of user features; and combining a first output of the first machine learning model and a second output of the second machine learning model to determine the score.

2. The method of claim 1, wherein the obtaining a set of user features comprises:

determining, a user group based on the user information; and wherein the set of user features comprises a feature of the user group.

3. The method of claim 1, further comprising: performing a responsive action based on the score.

4. The method of claim 1, wherein the activity information comprises an identity (ID) of the activity that triggers the alert.

5. The method of claim 1, wherein the activity information comprises a time at which the alert is triggered.

6. The method of claim 1, wherein the activity information comprises one or more parameters of an Application Programming Interface (API) call that triggers the alert.

7. The method of claim 1, wherein the activity information comprises a name of a resource that triggers the alert, or a length of the activity that triggers the alert.

8. The method of claim 1, wherein the user information indicates a geographic location of the user that initiates the activity.

9. A non-transitory computer-readable medium containing instructions which, when executed, cause an electronic device to perform operations comprising:

receiving an alert, wherein the alert comprises activity information and user information;

obtaining a set of activity features based on the activity information, wherein the activity information indicates an activity that triggers the alert, and the set of activity features comprises features of the activity that triggers the alert;

obtaining a set of user features based on the user information, wherein the set of user features comprises features of a user that initiates the activity; and determining a score of the alert based on the set of activity features and the set of user features, wherein the determining the score comprises:

using a first machine learning model to process an activity feature vector determined based on the set of activity features;

using a second machine learning model to process a user feature vector determined based on the set of user features; and combining a first output of the first machine learning model and a second output of the second machine learning model to determine the score.

10. The computer-readable medium of claim 9, wherein the obtaining a set of user features comprises:

determining, a user group based on the user information; and wherein the set of user features comprises a feature of the user group.

11. The computer-readable medium of claim 9, the operations further comprising: performing a responsive action based on the score.

12. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving an alert, wherein the alert comprises activity information and user information;

obtaining a set of activity features based on the activity information, wherein the activity information indicates an activity that triggers the alert, and the set of activity features comprises features of the activity that triggers the alert;

obtaining a set of user features based on the user information, wherein the set of user features comprises features of a user that initiates the activity; and determining a score of the alert based on the set of activity features and the set of user features, wherein the determining the score comprises:

using a first machine learning model to process an activity feature vector determined based on the set of activity features;

using a second machine learning model to process a user feature vector determined based on the set of user features; and combining a first output of the first machine learning model and a second output of the second machine learning model to determine the score.

13. The computer-implemented system of claim 12, wherein the obtaining a set of user features comprises:

determining, a user group based on the user information; and wherein the set of user features comprises a feature of the user group.

* * * * *